H. ARIENS.
PORTABLE CONTAINER.
APPLICATION FILED JULY 2, 1913.

1,078,981.

Patented Nov. 18, 1913.

2 SHEETS—SHEET 2.

UNITED STATES PATENT OFFICE.

HENRY ARIENS, OF BRILLION, WISCONSIN, ASSIGNOR TO BRILLION IRON WORKS, OF BRILLION, WISCONSIN.

PORTABLE CONTAINER.

1,078,981. Specification of Letters Patent. Patented Nov. 18, 1913.

Application filed July 2, 1913. Serial No. 776,958.

*To all whom it may concern:*

Be it known that I, HENRY ARIENS, a citizen of the United States, and resident of Brillion, in the county of Calumet and State of Wisconsin, have invented certain new and useful Improvements in Portable Containers; and I do hereby declare that the following is a full, clear, and exact description thereof.

The object of my invention is to provide a simple, economical and effective portable container, the same being especially designed for molders' use and so constructed and arranged that the labor of carrying and pouring molten metal can readily be accomplished by a single operator, thereby greatly economizing in time and labor, the apparatus being suspended from an overhead track system in such manner that the container or vessel can be moved from place to place longitudinally or transversely of a floor to selected positions over a series of molders' flasks without exerting any material force in proportion to the load and, while the apparatus is particularly designed for molders' use, it may be adapted for conveying and pouring various commodities.

With the above objects in view the invention consists in certain peculiarities of construction and combination of parts as hereinafter set forth with reference to the accompanying drawings and subsequently claimed.

Figure 1:
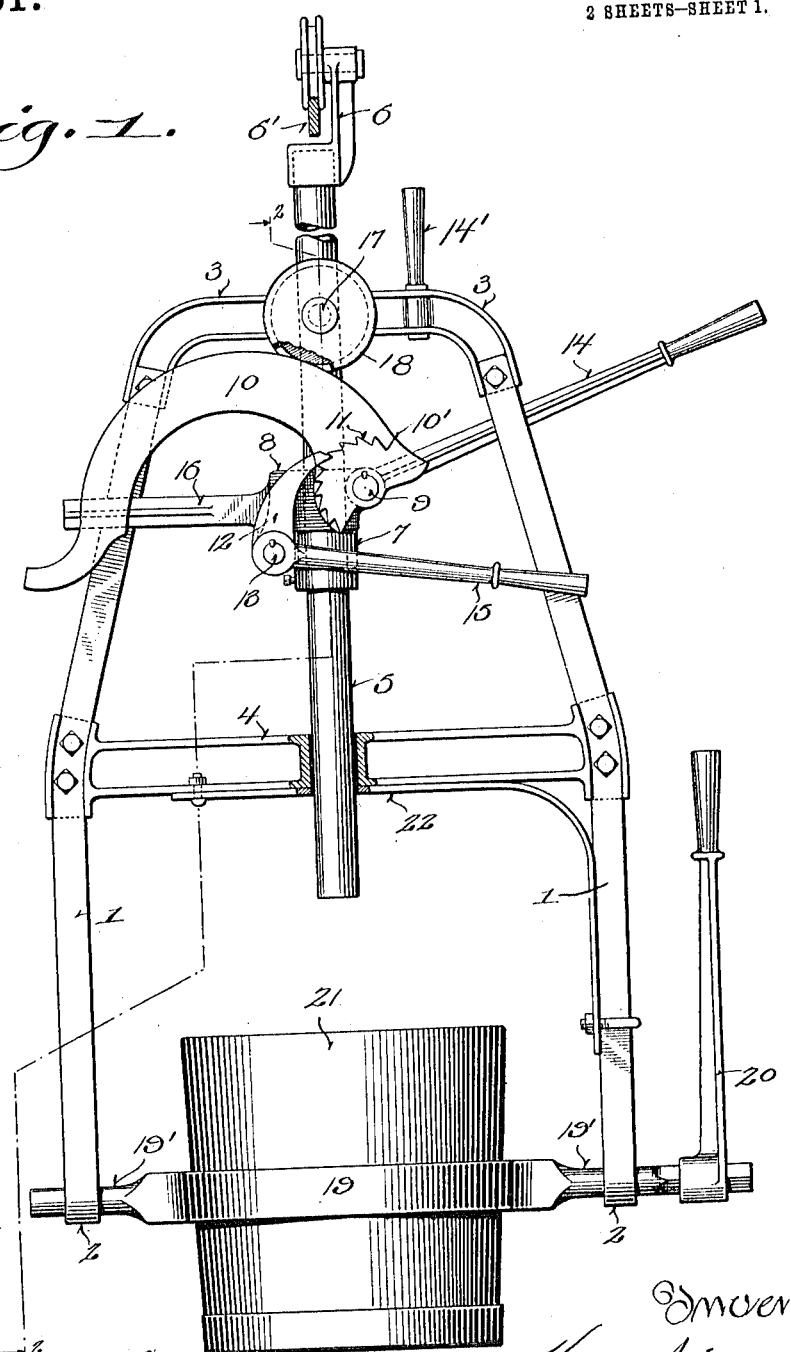
Figure 2:
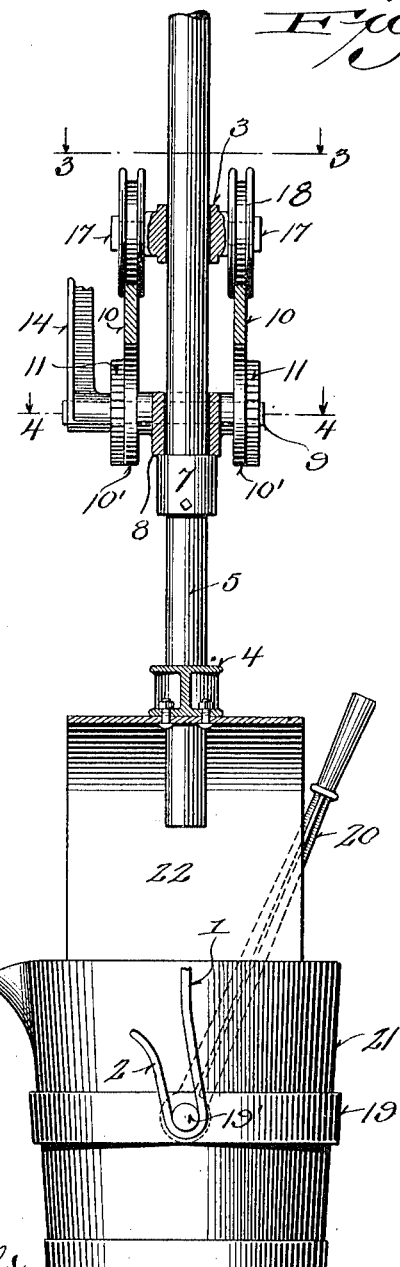
Figure 3:
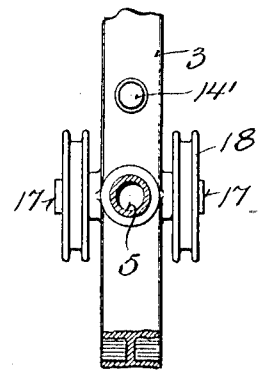
Figure 4:
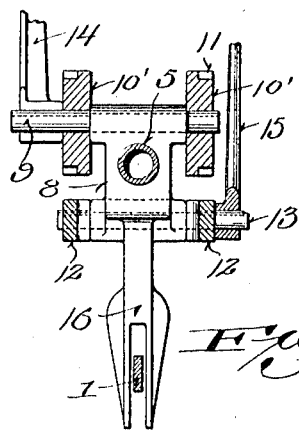

In the drawings Figure 1 represents a face view of a portable conveying and dumping apparatus embodying the features of my invention, parts being broken away and other parts in section to more clearly show structural features; Fig. 2, a sectional elevation of the same, the section being indicated by line 2—2 of Fig. 1, and Figs. 3 and 4, detailed cross-sections of the apparatus, the sections being indicated by lines 3—3 and 4—4 respectively of Fig. 2.

Referring by characters to the drawings, 1, 1, represent a pair of bail arms that terminate with receiving hooks 2 at their lower ends, the said bail arms being connected at their upper ends by a yoke 3 having a centrally bored hub. The bail arms are also intermediately connected by a centrally apertured cross-brace 4, the said parts together forming a vessel-supporting skeleton frame.

A vertically disposed hanger-rod 5 is revolubly fitted through the yoke-hub and cross-brace aperture, which hanger-rod is suspended from a trolley 6, the same being adapted to travel upon an overhead track-rail 6', a series of which rails are grouped in parallel stretches communicating with end stretches over a floor, whereby the frame may be moved from place to place. The trolley system forms no part of my present invention except so far as to embody means for supporting and moving the apparatus as described and is therefore not shown. The hanger-rod is provided with a set collar 7 that is adjustably secured thereto intermediate of the yoke and cross-bar members of the frame. Seated upon the collar is a bored head-block 8, which head-block is loosely mounted upon the hanger-rod and is provided with a horizontally bored ear for the reception of a revoluble shaft 9. The opposite projecting ends of this shaft have secured thereto the hubs 10' of circular cam-members 10 having upturned ends constituting stops. The hubs of the cam members are formed with ratchet-teeth 11 arranged to be engaged by dogs 12, which dogs are fast upon the ends of a stud 13, the latter being journaled in a transversely bored ear with which the head-block is provided. Both the cam-carrying shaft 9 and dog-carrying stud have secured thereto actuating levers 14 and 15 respectively, the same being upon opposite sides of the hanger-rod. The head-block 8 also has a slotted tail-piece 16 projecting from one side, the slot being engaged by one of the bail arms and hence when the skeleton frame as a whole is revolved about the hanger-rod it causes the head-block to follow therewith, while at the same time said slotted connection permits the free rise and fall of the bail. Projecting from the centrally bored hub of the yoke 3 are fixed studs 17, upon which studs are mounted grooved anti-friction rollers 18 constituting frame-engaging means for the cam-members. The hooked ends of the bail arms form open boxes for trunnions 19' that project from a vessel-receiving ring 19, one of which trunnions carries a dumping-lever 20. The ring 19 has fitted therein a pouring vessel 21 and, in order to protect the operator from molten metal contained therein the skeleton frame carries a shield-plate 22, which shield-plate is secured to one of the bail arms and the cross-brace 4.

From the foregoing description it is apparent than an operator may move the apparatus upon the rail 6' to a selected position over a flask, it being understood that the vessel containing molten metal is suspended from the frame, whereby the load is transmitted to the desired position. In conveying the loaded vessel, the operator first, by a simple downward movement of the lever 14, will cause the cam-members 10 to revolve about their axes and thus said cam members exert a lifting force upon the frame engaging means, which, in this instance, is the anti-friction roller 17. Thus the frame is elevated upon the hanger-rod, the limit of such movement being that of the scope of the cam members, which movement is checked by engagement of the stop at the free end of said cam members with the rollers. The load now being in position over the flask the operator may swing the vessel-suspending frame about the hanger-rod to place the discharge mouth of the vessel in the desired position and, for swinging the frame, I provide a convenient handle 14', which extends from the yoke 3. The next operation is to lower the vessel so as to position the mouth of the same as close as possible to the pour-hole of the flask. This lowering operation is effected by first releasing the dogs 12 from their toothed engagement with the cam-member hubs, which movement is effected by manipulating the lever 15. The operator thereafter manipulates lever 14 to cause the cam-members to rotate in the opposite direction from that previously described, whereby the load is gradually lowered to the desired elevation, it being understood that, in lifting the load, the dogs will automatically lock the cam in a step by step movement as said cam rises coincident to downward movement of the lever 14. Thus it will be observed that the load or vessel containing the molten metal can be adjusted to a selected elevation with respect to the hanger-rod and that said vessel can also be rotated about the axis of the hanger-rod so as to position its mouth for pouring.

I claim:

1. A portable track-supported container comprising a hanger-rod, a frame in slidable engagement therewith, a supporting head-block for the frame carried by the hanger-rod, cam-actuated connecting means between the frame and head-block whereby said frame is raised and lowered relative to the hanger-rod, means for locking the cam-actuating means, and a tiltable vessel supported by the frame.

2. A portable track-supported container comprising a hanger-rod, a head-block carried thereby, a revoluble and slidable frame mounted upon the hanger-rod and supported by the head-block, an oscillatory cam-member carried by the head-block, means extending from the frame for engagement with the cam, means carried by said head-block for locking the cam in a selected position, and a vessel support having trunnions mounted in the frame.

3. A portable track-supported container comprising a hanger-rod, a head-block secured thereto, an oscillatory cam-member having a ratchet-toothed hub mounted upon the head-block, an actuating lever extending from the cam member, a dog carried by the head-block for engagement with the ratchet-toothed hub of the cam-member whereby the latter is locked in selected positions, means extending from the frame for engagement with said cam member, and a tiltable vessel supported by the frame.

4. A portable track-supported container comprising a hanger-rod, a collar adjustably secured to the hanger-rod, a head-block loosely mounted upon the hanger-rod and engageable with the collar, an oscillatory cam carried by the head-block, the cam being provided with a ratchet-toothed hub, a dog for engagement with the hub teeth, means for actuating the cam, a frame having upper and lower apertures engageable with said hanger-rod, trunnion supports extending from the lower end of the frame, a vessel support having trunnions adapted to be fitted in the frame trunnion supports, and a roller extending from the frame engageable with the cam member.

In testimony that I claim the foregoing I have hereunto set my hand at Brillion in the county of Calumet and State of Wisconsin in the presence of two witnesses.

HENRY ARIENS.

Witnesses:
R. L. BUBOLTZ,
MARK P. OHLSEN.

---

Copies of this patent may be obtained for five cents each, by addressing the "Commissioner of Patents, Washington, D. C."